May 12, 1942.   E. N. WAHRENBROCK   2,282,837
POWER LAWN MOWER
Filed Sept. 25, 1939   2 Sheets-Sheet 1

INVENTOR:
ELMER N. WAHRENBROCK
BY
O. O. Martin
ATTORNEY.

May 12, 1942.　　　E. N. WAHRENBROCK　　　2,282,837
POWER LAWN MOWER
Filed Sept. 25, 1939　　　2 Sheets-Sheet 2
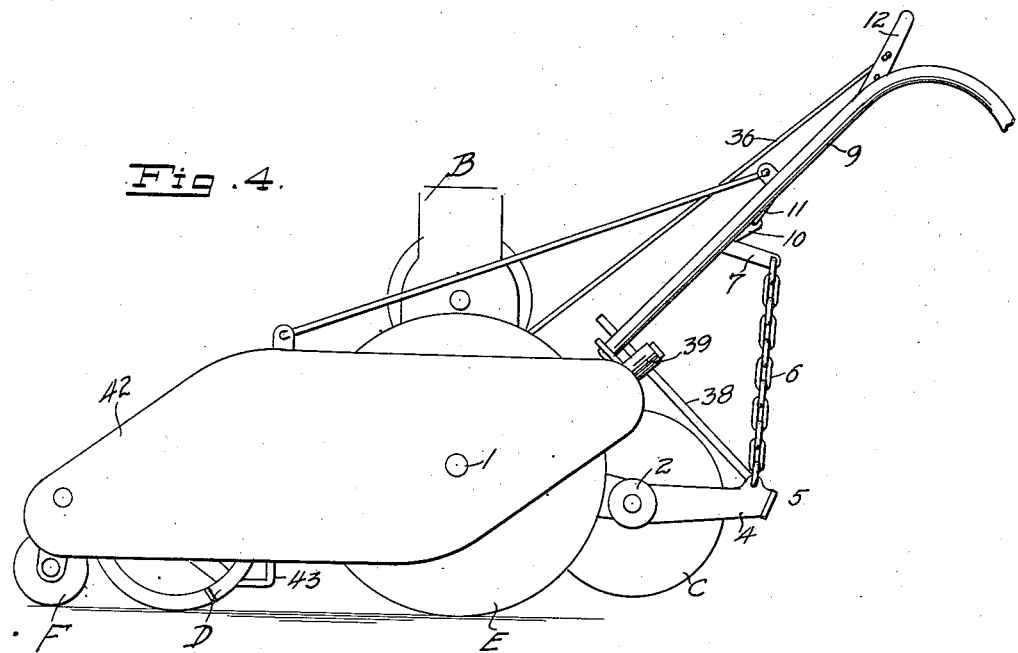
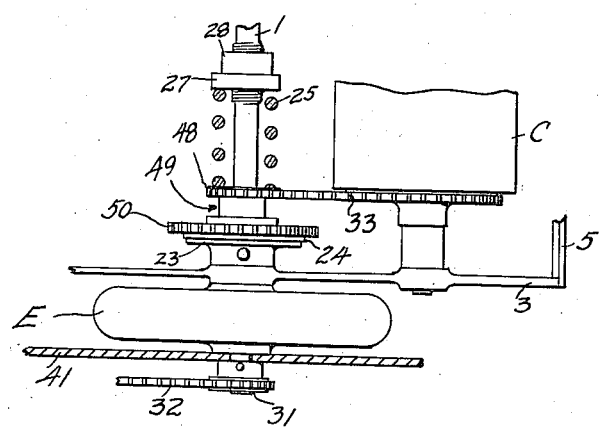
INVENTOR.
ELMER N. WAHRENBROCK
BY
ATTORNEY.

Patented May 12, 1942

2,282,837

UNITED STATES PATENT OFFICE 2,282,837

POWER LAWN MOWER

Elmer N. Wahrenbrock, Los Angeles, Calif.

Application September 25, 1939, Serial No. 296,434

9 Claims. (Cl. 56—26)

This invention relates to lawn movers and particularly to power driven machines of this type.

It is the principal object of the invention to provide a machine capable of operation very close to any object rising vertically out of a lawn or bordering upon the lawn. Further objects are improved control mechanisms for the various drives of the machine in order to provide a device which is easy to operate and of great efficiency.

With the foregoing and further objects in view, as will become apparent upon perusal of the detailed description to follow, the invention consists in the combinations illustrated in the accompanying drawings, of which:

Fig. 3 is a fragmentary plan view disclosing a modification of part of the driving connections for purposes that will become apparent upon perusal of the following description; and Fig. 4 is a side elevation of the machine as viewed from the opposite side and it is added in order clearly to show that one side of the machine is entirely free from projecting obstructions.

Figure 1:
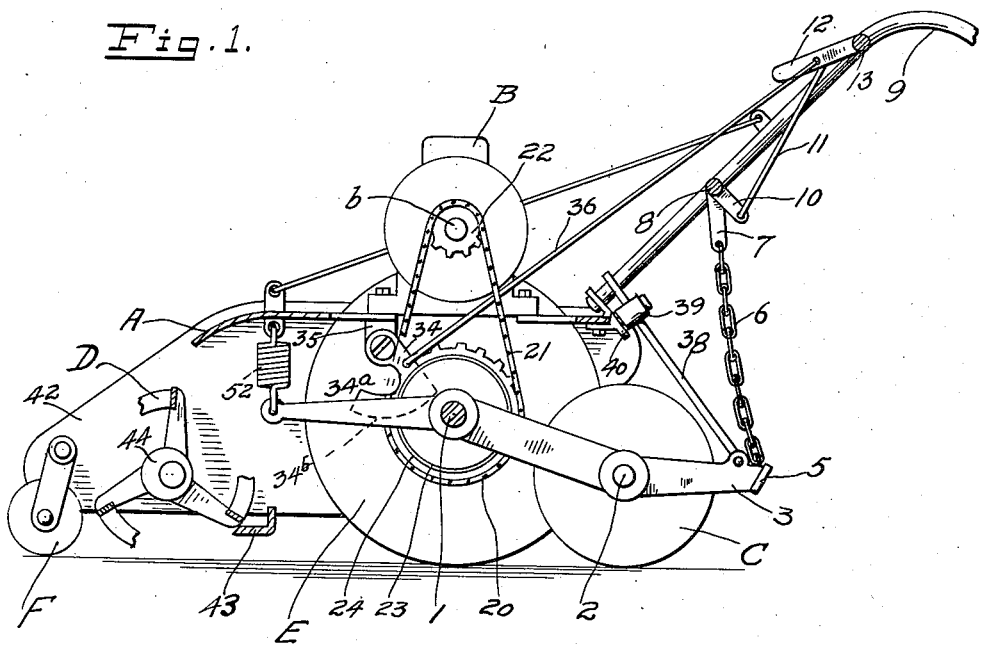
Fig. 1 is a side elevation of a power lawn mower embodying the invention and with the side plate nearest the observer broken away.
Figure 2:
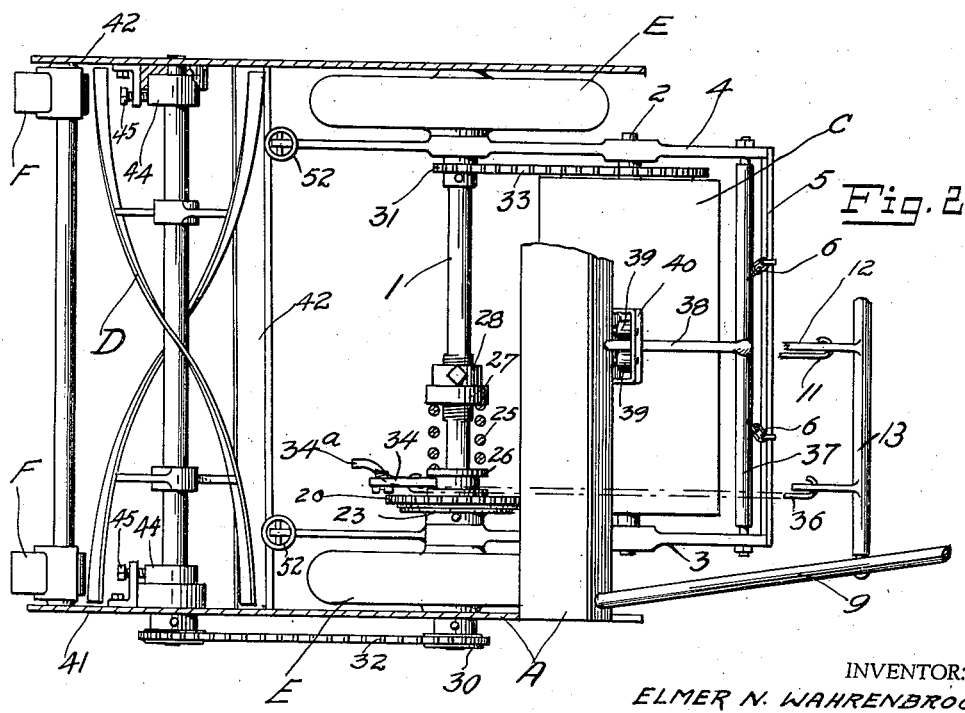
Fig. 2 is a substantially corresponding plan view of the invention, in which some parts of the framing and of parts fastened thereto are broken away for the sake of clearness.

The device of the invention comprises a frame A, a suitable prime mover B, which preferably is an internal combustion engine, a traction roller C, a rotary cutter D, large center wheels E, and front wheels F. Generally speaking, these elements are found in power mowers of this type in commercial use.

The weight of the machine is mainly supported on the large wheels E, and these wheels are mounted for rotation on a main shaft 1. This shaft is rotatable in bearings of the frame A, preferably on ball or roller bearings in order to reduce friction.

The traction roller C is shown secured to a shaft 2, and this shaft is mounted to rotate in levers 3, 4, which in turn are journaled on the main shaft 1. The outer ends of these levers are shown interconnected by means of a brace 5, and suitable means, such as links 6 extend from this brace to an arm 7 of a rod 8. The latter is journaled in a handle bar frame 9 and it carries an arm 10 which, by means of a link 11, is interconnected with an operating lever 12, of a rod 13. When the lever 12 is swung upward, it is seen that the traction roller is raised clear of the ground.

While the traction roller is held elevated, it is possible to tilt the machine slightly to raise the front wheels off the ground, whereupon the machine may be wheeled along on the main wheels E. A sprocket wheel 20 is rotatably fixed on the main shaft 1, and it is by a chain 21 shown operatively connected to a sprocket 22 of the engine drive shaft b. From this, it is seen that the sprocket 20 will rotate idly when the engine is started. A disc 23 is rigidly secured to shaft 1 adjacent to this sprocket wheel and it is fitted with suitable clutch lining 24, against which the sprocket wheel is pressed for the purpose of driving the main shaft from the engine. The means effecting clutch engagement of the parts enumerated is shown to comprise a powerful spring 25, held on the shaft 1 between a grooved sleeve 26, which is axially slidable on the shaft, and a collar 27, and the latter may be axially moved to adjust the spring tension as by seating the collar on screw threads, substantially as shown. A set collar 28 may be added to maintain the collar 27 in adjusted position on the shaft.

Two sprocket wheels, 30 and 31, are rigidly secured to shaft 1, and these sprockets are by chains 32, 33 connected to rotate the cutter D and the traction roller C, respectively, with the result that engine rotations impart rotation to these parts when the clutch is engaged. For the purpose of releasing the clutch mechanism, a lever 34 is shown hung on a pendent bracket 35 of the machine frame, and this lever is made with an offset portion 34ᵃ the outer curve 34ᵇ of which rides in the groove of the sleeve 26 to move the latter axially to release the clutch. A rod 36 extends from the lever 34 to a position within easy reach of the operator, by whom it is manually operated to control the clutch. Or this rod may be shortened and hooked into the lever 12, as indicated in Fig. 1, automatically to release the clutch when the traction roller is elevated, if preferred.

Because the traction roller is mounted in the levers 3, 4, there is a possibility that sidewise swaying movement of these levers, when the roller travels over uneven ground or in making turns, may disturb the smooth operation of the sprocket and chain drive, and it may for this reason be found advisable to provide means designed to check such swaying movement. Such means is here shown to comprise a rod 37, pivotally hung in the levers 3, 4, from which extends an arm 38, and the latter passes between a pair of rollers 39 of a fixed bracket 40. While this construction eliminates sidewise swaying movement, it does not interfere with the raising and lowering of the traction roller.

The cutter D is long enough to occupy the entire space between the side members 41, 42 of the machine frame, and it is noticed that they are positioned outside the wheels E and F. When these members, or at least one of the members, as in this case the member 42, are made from sheet metal, they can be so thin that the machine, on the side of the member 42, can cut within a fraction of an inch of a tree, pole, curb, or any other object bordering upon the lawn to be cut, or positioned thereon. This is a very important advantage of the device of the invention and is not attained in any other device which has come to my notice. While the cutter drive in the drawings is shown placed at the left, it may of course be moved to the right side in order to make the left side close cutting, if preferred.

It is important in devices of the character herein considered, to align the cutter properly with the cutting bar 43, and this is usually done by adjustment of the latter. I have found it preferable, however, to make the cutter adjustable and have, to this end, shown the cutter shaft seated in eccentric bushings 44, a slight rotation of which results in fine alignment of the cutter, whereupon the bushings are clamped in position, as by set screws 45. Roller or ball bearings should be provided within these bushings in order to eliminate friction losses.

It will be understood from the foregoing description that the machine may be freely wheeled about when the traction roller is elevated. Some power lawn mowers, however, are so large and heavy that they cannot always conveniently be wheeled about by the operator, in which case the driving connections are modified to permit perambulation by means of traction roller rotations without rotating the cutter. This may be accomplished as indicated in Fig. 3, where the sprocket wheel 31 has been removed and a similar wheel 48 has been mounted on or fastened to the sleeve 49. The sprocket wheel 20 has been replaced by a similar wheel 50, and this wheel is also fastened to the sleeve 49. The result is that the traction roller in this case is directly connected to the engine. But the cutter is still driven through the medium of the clutch mechanism, which may remain as above described.

The cutter D is of the type ordinarily employed to mow lawn grass, but other types of cutters, such as the cutters in commercial use for lawn renovating may, of course, be substituted. Other modifications may also be effected, within the scope of the appended claims. It may be found preferable, for example, to reduce the weight of the traction roller in order to facilitate manual perambulation of the machine, and to provide suitable springs 52 between rear extensions of the levers 3, 4 and the machine frame.

I claim:

1. A lawn mower comprising, thin sheet metal side plates, a main shaft rotatably hung in said side plates, side wheels hung on said shaft within said plates, a cutter mechanism journaled in said plates in front of said shaft and bridging the space therebetween, front wheels, a traction roller pivotally hung on said main shaft to the rear thereof, means for elevating said roller, driving connections between said shaft said roller and the said cutter mechanism on one side of the mower only, a prime mover, means interconnecting the latter with said shaft said roller and cutter mechanism, and manual means controlling said interconnections.

2. A lawn mower comprising, thin side plates, a main shaft hung in said plates, wheels rotatable on said shaft within the plates, rearwardly directed levers hung on the shaft within said wheels, a traction roller hung in said levers, a prime mover, a rotary cutter mechanism in front of said wheels bridging the space between said plates, wheels in front of said cutter mechanism, a driving member on the shaft, a clutch mechanism for operatively connecting said member with the shaft, connections from said prime mover to the said member, and driving connections from the shaft to said traction roller.

3. A power lawn mower comprising, a frame, a mainshaft rotatable in said frame, centrally positioned ground wheels rotatable on said shaft, a traction roller held freely rearwardly suspended from said shaft, a cutter rotatable in the frame in front of said shaft, front wheels in front of said cutter, a prime mover connected to rotate said shaft, connections from the shaft to said traction roller and to said cutter, an operating handle, and means operable from said handle for controlling said main shaft connections.

4. A lawn mower comprising, a frame, a main shaft in said frame, ground wheels rotatable on said shaft, a traction roller held freely rearwardly suspended from said shaft, front wheels in the frame, a cutter between said ground wheels and said front wheels, an operating handle, and means operable from said handle for controlling said main shaft connections.

5. A lawn mower comprising, a frame, a main shaft in said frame, ground wheels rotatable on said shaft, a traction roller freely rearwardly suspended from said shaft, front wheels in the frame, and means manually operable for raising said traction roller off the ground, thereby to adapt the mower to be tilted on the ground wheels to raise its front end off the ground for easy manual perambulation.

6. A lawn mower comprising, a frame, a main shaft in said frame, ground wheels rotatable on said shaft, a traction roller freely rearwardly suspended from said shaft, front wheels in the frame, a cutter between said ground wheels and the said front wheels, an operating handle, means manually operable from said handle for raising said roller off the ground, and means guiding said traction roller to prevent sidewise swaying thereof.

7. A lawn mower comprising, a frame, a main shaft rotatable in said frame, ground wheels rotatable on the shaft, a traction roller held freely rearwardly suspended from the shaft, means yieldingly pressing said roller against the lawn surface, front wheels in the frame, an operating handle, and means operable from said handle for controlling said traction roller vertically.

8. In a lawn mower having thin side plates, centrally positioned ground wheels within said plates, front wheels at the forward end of and within said plates, a rotary cutter between said wheels spanning the distance between the plates, a traction roller hung behind said central wheels, a handle, means on said handle for moving said traction roller vertically, a main shaft, and connections from said shaft externally of one of said side plates to rotate said cutter.

9. A lawn mower comprising a frame having thin side plates, centrally positioned ground wheels, front wheels, a rear vertically adjustable traction roller, and a cutter mounted for rotation between said ground and front wheels, all within said plates, the frame normally resting on said ground and front wheels and being tiltable on said central ground wheels upon raising said traction roller to rest upon the latter to maintain the cutter and the front wheels elevated above the ground.

ELMER N. WAHRENBROCK.